Patented Feb. 27, 1940

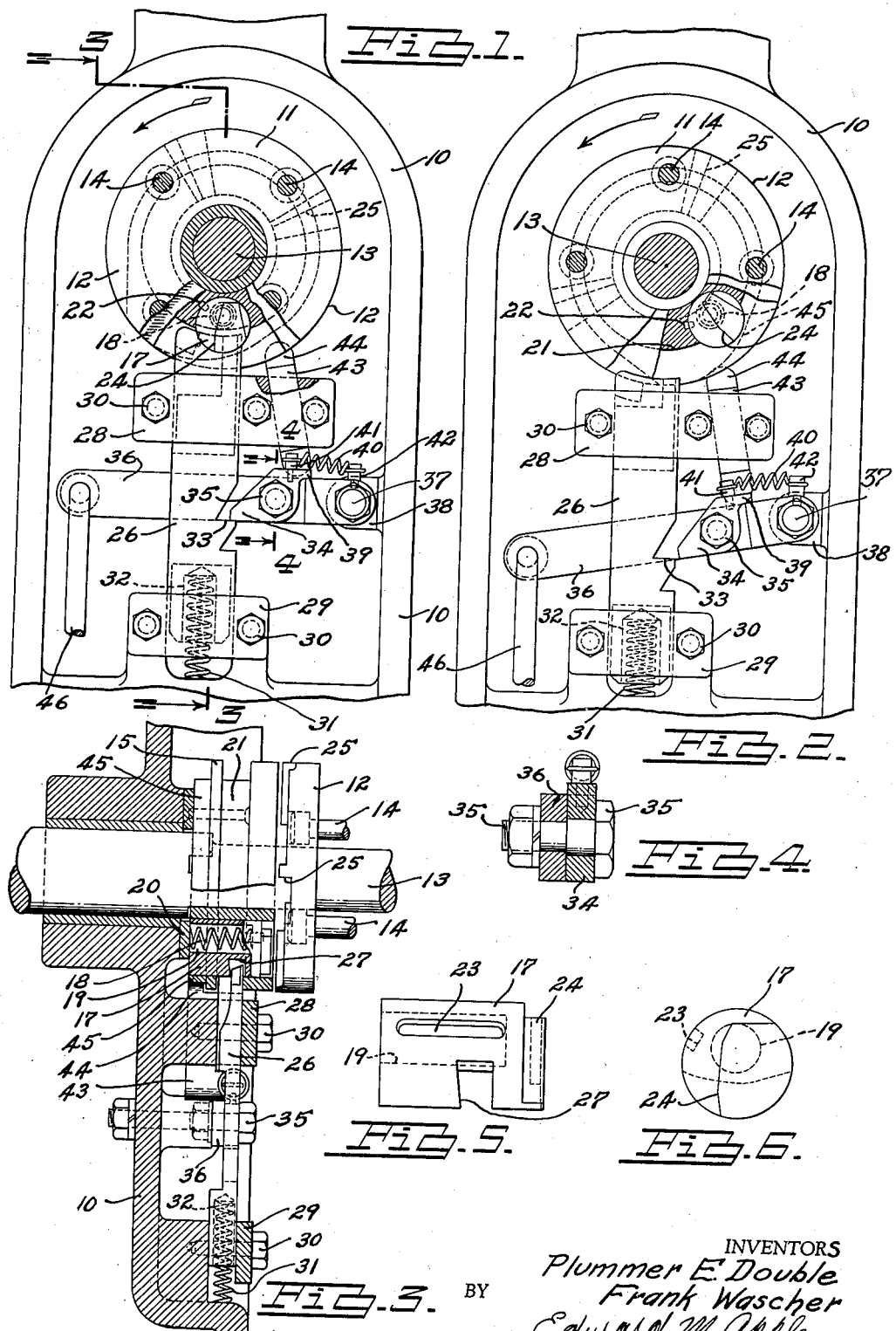

2,191,983

UNITED STATES PATENT OFFICE 2,191,983

CLUTCH MECHANISM

Plummer E. Double, Detroit, and Frank Wascher, Flint, Mich.

Original application July 28, 1937, Serial No. 156,184. Divided and this application July 22, 1938, Serial No. 220,731

1 Claim. (Cl. 192—25)

This invention relates to clutch mechanism and has particular reference to a clutch adaptable for use with clinch nut machines such as disclosed in our co-pending application S. N. 156,184, filed July 28, 1937, of which this application is a division.

An object of the invention is to generally improve clutches, and provide a device simple in construction and efficient in operation.

Another object of the invention is to provide a clutch mechanism which insures a high degree of safety for the operation of a machine to which it is attached.

A further object of the invention is to provide a clutch which permits the machine to make one complete operation and then become inoperative until positively actuated again.

The foregoing and other objects and advantages of the invention will appear as the description proceeds, reference being made from time to time to the accompanying drawing, wherein:

Fig. 1 is a fragmentary detail of a machine, equipped with our improved clutch mechanism, and illustrates the clutch in neutral position.

Fig. 2 is a view similar to Fig. 1, but illustrating the clutch after it has been tripped and is in the process of making an operating cycle.

Fig. 3 is a view, partly in section, taken on line 3—3 of Fig. 1.

Fig. 4 is a section taken through the clutch operating lever on line 4—4 of Fig. 1.

Fig. 5 is a side elevation of the clutch operating pin.

Fig. 6 is an end view of the pin shown in Fig. 5.

Referring now more particularly to the drawing, (Figs. 1 and 2), it will be seen that in the embodiment herein disclosed, we have illustrated our improved clutch mechanism as forming part of a clinch nut machine, the housing of which is a casting, designated by the reference numeral 10, which also serves as a support for the clutch and its associated parts.

The clutch which we designate generally by the reference character 11, consists of a plate 12, which is freely mounted on the shaft 13 and is adapted to be secured to the engine fly wheel (not shown) by the fillister head screws 14. The clutch plate 12 is arranged to engage the pin 17, which is mounted in the clutch collar 15, as hereinafter described. The collar 15 serves as a mounting or retainer for the pin 17, which is adapted to slide in a recess formed therein. The collar 15 is press-fitted on the shaft 13, and held against rotation thereon, by milling flat surfaces on either side of the shaft 13, and by providing corresponding flat surfaces on the inner walls of said collar. The pin 17 is normally held in extended position by means of compression spring 18 which is carried in an internal bore 19 provided in one end of the clutch pin 17. The spring 18 is arranged to contact the thrust collar 20 which is secured to the clutch collar 15 by means of rivets 21. The clutch pin 17 is held against rotation by means of a key 22 (Figs. 1 and 2) which is arranged to engage a slot 23 (Fig. 5) formed in the clutch pin 17. The working surface 24 of the clutch pin 17 is adapted to engage corresponding working surfaces 25 formed on the face of the clutch plate 12. The clutch pin 17 is held in inoperative position by means of the clutch release bar 26, the upper end of which is arranged to engage the slot 27 formed in the under side of the clutch pin 17. The clutch release bar is slidably mounted in recesses formed in the main housing 10 and secured against displacement by cover plates 28 and 29 which are secured in position by cap screws 30. The clutch release bar 26 is normally held in upward position by means of a compression spring 31, which rests at the bottom on the casting 10, and at the other end abuts the end of a bore 32 formed in the bar 26. The clutch release bar 26 (Figs. 1 and 2) is provided along one side with an under cut bearing surface 33 which is arranged to engage the trip pawl 34 rockingly secured by means of stud 35 to the trip lever 36, the latter being pivoted by means of stud 37 in a boss 38 formed on the inside of the casting 10. The bar 26 has a notch formed below the surface 33, which is adapted to provide clearance for the trip pawl 34, to prevent its locking against the bar 26 on the up-stroke of the bar. The pawl 34 is arranged to rock downwardly and is held against upward displacement by means of an offset 39, which is arranged to ride on the top surface of the lever 36. A tension spring 40 is secured between a mounting stud 41, fastened in the upper side of the pawl 34, and a mounting stud 42 which is carried in the upper surface of the trip lever 36. This spring is arranged to return the pawl 34 to its normal position shown in Fig. 1 after it has been rocked downwardly.

A cam block 43 is slidably mounted in the casting 10 and secured against displacement by the cover plate 28, and rests of its own weight on the top of the trip lever 36. The cam block 43 is formed at its upper end with a curved surface 44 which is adapted to ride on cam surface 45. The cam face 45 is made with a true radius over approximately three-fourths of its circumference, and then forms a hump, which is intended to impart a downward motion to the cam block 43. The cam surface 45 is formed on the clutch collar 15, for the purpose of holding the pawl 34 out of engagement with the bar 26, so that the latter may return to its normal position to enable it to engage the slot 27 formed in the clutch pin 17, to disengage the clutch pin 17 from the clutch plate 12, upon the completion of a single revolution. With this mechanism the clutch can remain in engaged condition only during one revolution of the fly wheel and constitutes an important feature of this invention.

The trip lever 36 is connected to a foot pedal (not shown) by means of a connecting rod 46 so that the clutch may be engaged for one revolution only by the downward movement of the foot pedal (not shown). In order to re-engage the clutch 11 after one revolution it is always necessary to release the foot pedal (not shown).

Thus it will be seen that a single revolution may be given to the shaft 13, through the clutch 11, and that the clutch 11 will remain in inoperative position at the end of one revolution, unless made operative by a positive movement of the pedal and connecting rod 46.

The operation cycle of the clutch is as follows:

In Fig. 1, the clutch is in neutral. In this position the clutch pin 17 is locked out of operating position by means of bar 26. To engage the clutch, the trip lever 36, which is actuated by a connecting rod 46, which in turn is connected to a foot pedal (not shown), is depressed causing the bar 26 to be released from the clutch pin 17. Pin 17, under the influence of spring 18, moves outward toward the clutch plate 12, where the work surface 24 engages corresponding work surface 25 of the plate 12, which is constantly revolving with the fly wheel (not shown). The faces 24 and 25 remain engaged for one revolution of the shaft.

The bar 26 is held down during the first part of the revolution by means of the pawl 34 and is released when the pawl 34 is disengaged from the surface 33. When the bar 26 is released from the pawl 34, it moves upward under the influence of the spring 31, and is then ready to reengage the pin 17, upon the completion of the revolution. When the bar 26 reengages the pin 17, the clutch is disengaged.

In order to prevent the bar 26 from reengaging the pin 17, before the commencement of a revolution, the bar 26 is held down during the early part of the revolution by means of the cam block 43, which rides on the cam 45. The cam block 43 also forces the pawl 34 to disengage the surface 33, which allows the bar 26 to return to neutral position before one revolution has been completed. This prevents the shaft from making more than one revolution upon a single tripping of the machine.

Having described our invention, what we claim and desire to secure by Letters Patent is:

In a clutch mechanism, the combination of a shaft, a driving plate mounted for rotation on said shaft, a collar keyed to said shaft, a pin resiliently mounted in said collar and arranged to contact said plate, a bar arranged to hold said pin away from said plate, a trip lever, a pawl on said lever arranged to move said bar, and a cam block on said lever arranged to contact a cam surface on said collar, whereby said trip lever is controlled during one revolution of said collar.

PLUMMER E. DOUBLE.
FRANK WASCHER.